United States Patent [19]
Nguyen

[11] Patent Number: 5,283,002
[45] Date of Patent: Feb. 1, 1994

[54] ANTIFOAM/DEFOAMER COMPOSITION AND METHOD OF USE THEREOF IN AQUEOUS SYSTEMS

[75] Inventor: Duy T. Nguyen, Jacksonville, Fla.

[73] Assignee: Betz PaperChem, Inc., Jacksonville, Fla.

[21] Appl. No.: 775,673

[22] Filed: Oct. 11, 1991

[51] Int. Cl.$^5$ .............................................. B01D 19/04
[52] U.S. Cl. .................... 252/321; 252/358; 162/77
[58] Field of Search ................ 252/321, 358; 162/72, 162/77, 173, 179; 568/671, 678

[56] References Cited

U.S. PATENT DOCUMENTS

| | | | |
|---|---|---|---|
| 3,697,438 | 10/1972 | Lieberman | 252/321 OR |
| 3,705,860 | 12/1972 | Duvall | 252/358 |
| 3,723,342 | 3/1973 | Shane et al. | 252/358 |
| 3,953,121 | 1/1976 | Lieberman et al. | 252/321 |
| 3,959,175 | 5/1976 | Smith, Jr., et al. | 252/321 |
| 4,226,637 | 10/1980 | Linden et al. | 568/678 X |
| 4,599,189 | 7/1986 | Wuhrmann et al. | 252/358 X |
| 4,982,011 | 1/1991 | Hanin | 568/678 OR |
| 5,080,834 | 1/1992 | Clumpner et al. | 568/613 X |

Primary Examiner—Robert L. Stoll
Assistant Examiner—Daniel S. Metzmaier
Attorney, Agent, or Firm—Alexander D. Ricci; Gregory M. Hill

[57] ABSTRACT

A composition comprising a $\beta$-branched aldol ether alcohol having the structure:

$$CH_3-(CH_2)_x-\underset{\underset{O(CH_2)_x-CH_3}{|}}{\overset{\overset{H}{|}}{C}}-CH_2-OH$$

wherein X=5 to 8, at least one surfactant and water which is useful to prevent or reduce foam present in the aqueous medium of paper processing operations.

14 Claims, 5 Drawing Sheets

A PLOT OF FOAM HEIGHT VS. RECIRCULATION TIME
ALKALINE SYNTHETIC FINE PAPER
pH = 7.33, T = 110 F

—1— EXAMPLE 1, DOSAGE=45 PPM
=2= EXAMPLE 1, DOSAGE=90 PPM
···3··· EXAMPLE 2, DOSAGE=90 PPM
—4— EXAMPLE 8, DOSAGE=90 PPM
—5— EXAMPLE 4, DOSAGE=45 PPM
—6— EXAMPLE 4, DOSAGE=90 PPM
=7= EXAMPLE 5, DOSAGE=45 PPM
=8= EXAMPLE 3, DOSAGE=90 PPM

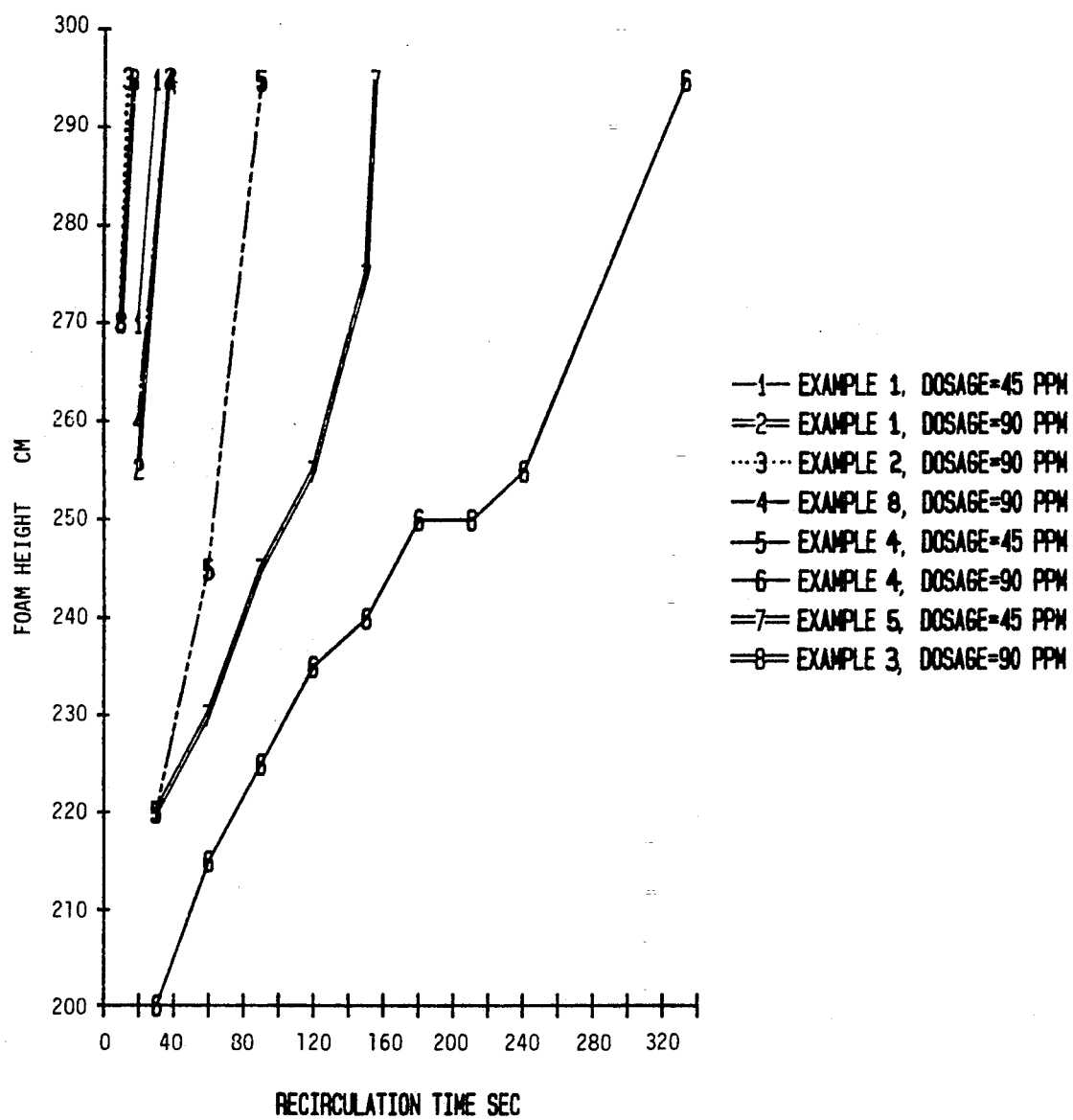

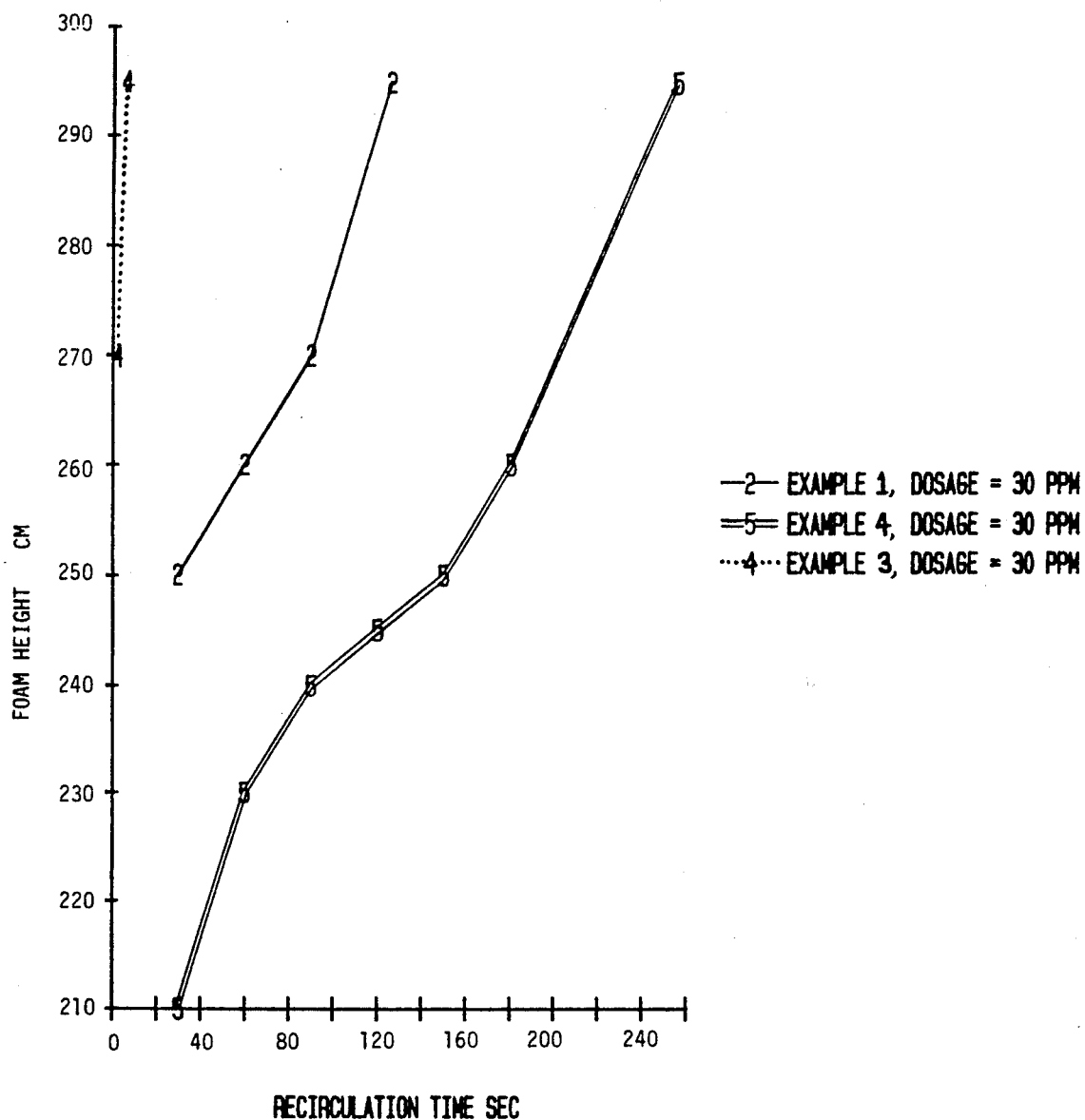

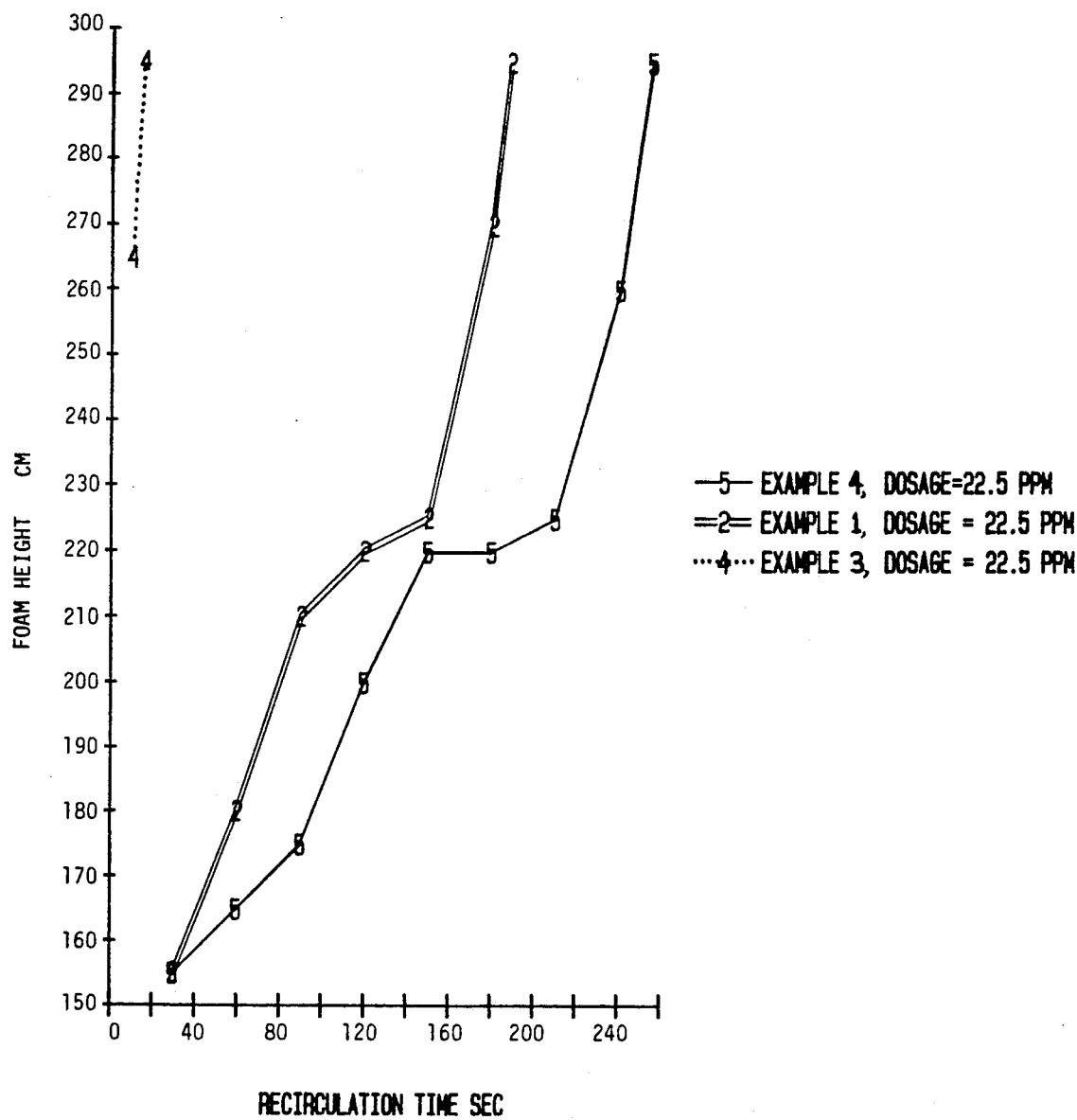

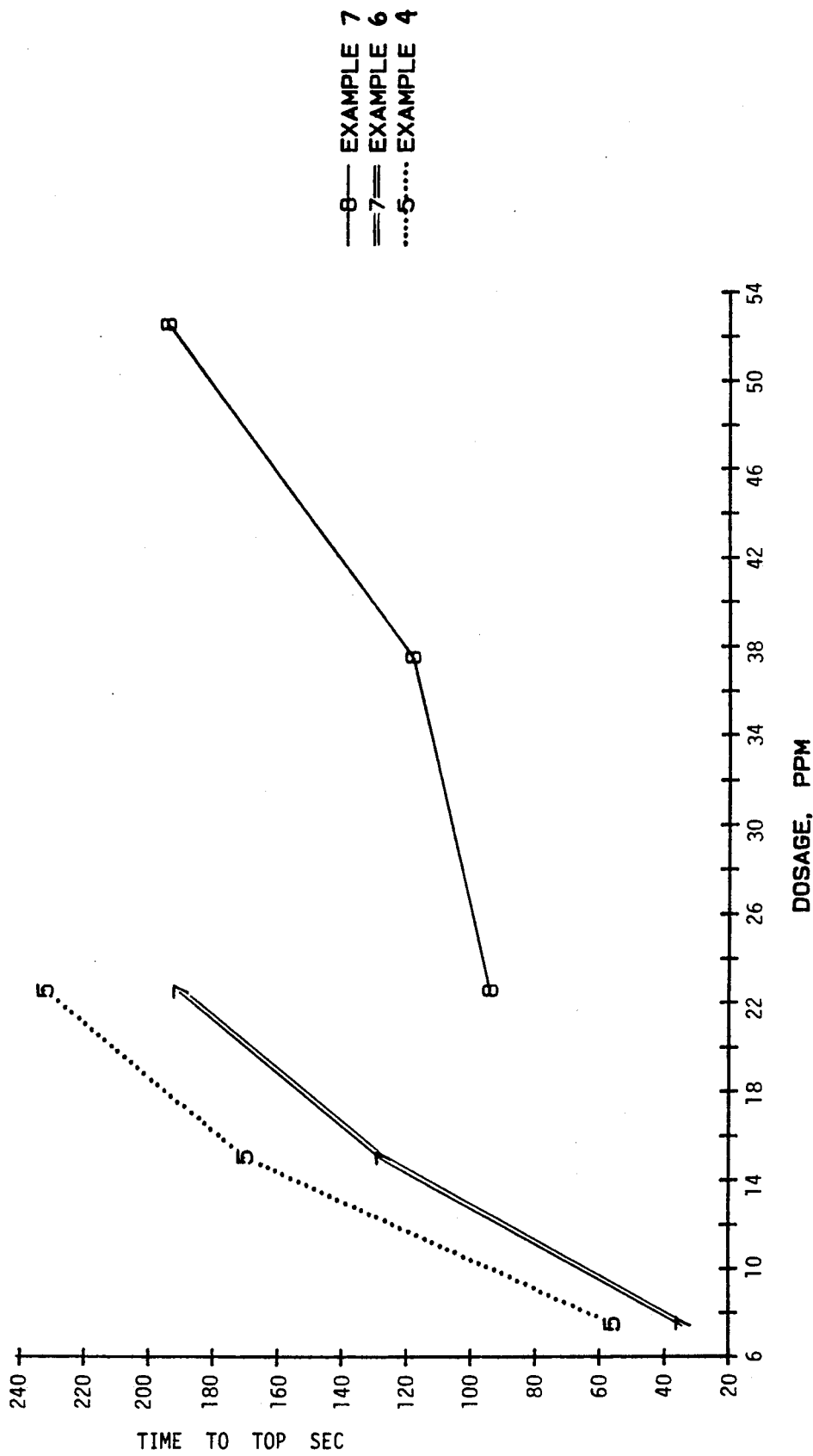

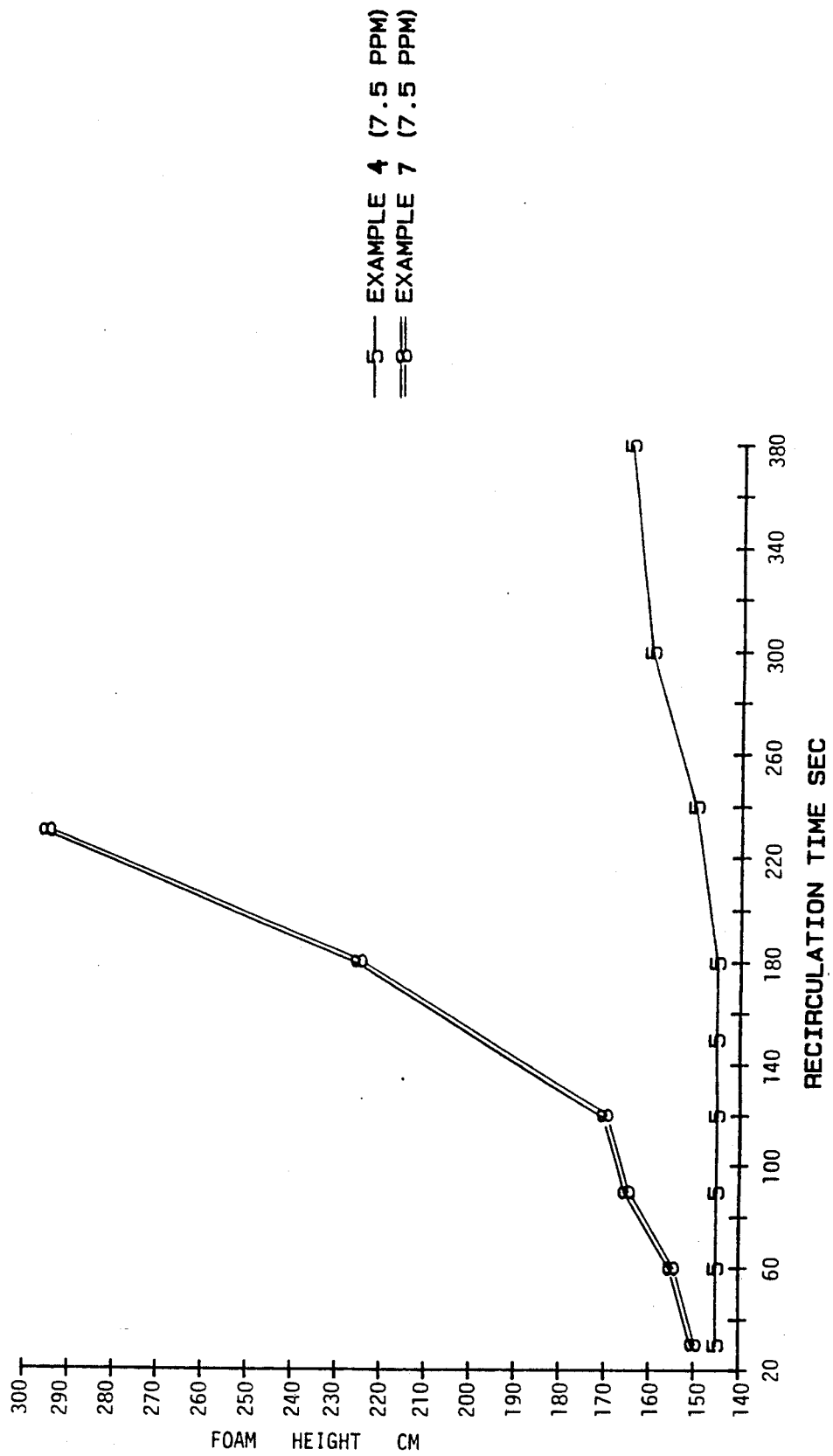

ANTIFOAM/DEFOAMER COMPOSITION AND METHOD OF USE THEREOF IN AQUEOUS SYSTEMS

FIELD OF THE INVENTION

The present invention relates to foam control compositions, their preparation and use in aqueous systems. These foam control compositions are particularly effective in pulp and paper processing.

BACKGROUND OF THE INVENTION

Foam is a colloidal system in which a gas is dispersed in a liquid. In a papermaking system, the gas is usually air and/or carbon dioxide and the liquid usually is water. Foam can exist either as bubbles of entrained air in bulk or as surface foam. Surface foam has a polyhedral shape (many-sided) which can be seen floating in chests, wire pits, trays, headboxes and on the machine wire. Surface foam is surrounded by a thin film of foam stabilizing particles of surfactant and water. Surface foam reduces drainage efficiency and causes rings, fisheyes and holes due to bursting of foam bubbles on the sheet. Surface foam also can foul papermaking equipment when surface foam collapses because it leaves behind finely divided solid particulates which are the foam stabilizing particles. Having a water shower on the surface may break the surface foam but does nothing for the entrained air.

Entrained air is the tiny spherical bubbles finely dispersed below the surface of the liquid and adsorbed on the surface of the fibers. Entrained air can greatly decrease the drainage rate of paper stock by blocking the voids in the fiber mat with tiny bubbles and hence machine speeds may have to be reduced to provide sufficient drainage time. Entrained air can also lower some of the sheet properties such as wet strength, tensile strength, smoothness, and also increase sheet porosity.

Most conventional antifoam or defoamer compounds consist of a hydrophobic material having a melting point greater than 40° C. or an insoluble material such as silica, dispersed in an oil phase. The production of these compounds requires the distinct, consecutive steps of heating and cooling. Due to the use of high melting point hydrophobic materials, the resulting compound quickly becomes unstable and the propensity for undesireable deposition in the treated aqueous system is very high.

GENERAL DESCRIPTION OF THE INVENTION

The defoamer/antifoam composition of the present invention comprises a polyhydric alcohol fatty acid ester and a high molecular weight, liquid, β-branched aldol ether alcohol. This composition is particularly effective in reducing or preventing, hence the respective defoamer or anti-foam label, both surface and entrained air foam in the aqueous medium found in various phases of a papermaking operation. It is especially useful in treating foaming problems in white water and is effective with numerous types of pulp slurries, such as those produced from fine paper, secondary fiber, newsprint and linerboard.

DESCRIPTION OF RELATED ART

Many conventional foam control programs contain silicon based compositions. One such program is exemplified in U.S. Pat. No. 3,705,860 which discloses a composition containing a non-polar oil, precipitated microfine silica, a metallo-organic catalyst, polymethylsiloxane and a microcrystalline paraffin wax. Processing requires heating the mixture to 110°-130° C. to insure adequate blending of the individual chemical compounds.

U.S. Pat. No. 3,723,342 discloses a defoamer for use in pulp mills comprising a silicone compound in the form of an oil blended with an aliphatic diamide, a low viscosity mineral oil and a spreading agent.

An improvement in the process of the '342 patent is disclosed in U.S. Pat. No. 3,935,121. The composition of the process contains an amide, a liquid hydrocarbon carrier, an emulsifier and a silicone oil. In the preparation of this composition, the blend must be heated to as much as 250° F. in order to obtain a clear melt.

U.S. Pat. No. 3,959,175 discloses a defoamer composition for use in aqueous systems comprising polybutene added to other compounds, such as surfactants, at least one of which must have a high melting point. It is most critical in this treatment that high melting point materials are present so that the resulting defoamer composition contains minute or precipitated particles.

BRIEF DESCRIPTION OF THE DRAWINGS

FIGS. 1–4 show the antifoam/defoaming results tested at different temperatures

FIG. 5 compares the efficacy of the antifoaming/defoaming composition with a fatty alcohol emulsion.

DETAILED DESCRIPTION OF THE INVENTION

Foaming in the white water which is generated during papermaking processing is significantly reduced or altogether prevented by the use of a composition comprising a β-branched aldol ether alcohol in combination with at least one surfactant having a melting point or pour point less than 20° C. The aldol ether alcohol exhibiting the most desired properties according to this invention is of a relatively high molecular weight for compounds of this type, having a number average (mw) of 320–500. It has a chemical structure represented by the following formula:

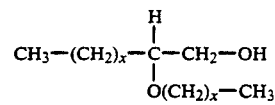

where $x = 5$ to 8. The molecule has a low surface tension value of approximately 28 dynes/cm and a hydroxyl value of 90–140. Such a molecule may be obtained from Nova Molecular Technologies, Inc., Lake Geneva, Wis., under the trade name Nova Aldol Alcohol 21 ™.

The surfactants can include but are not limited to polyethylene glycol dioleate ester, sorbitan ester or polyoxyalkylene ester. Many polyethylene glycol esters are commercially available. Characteristic examples are available from the Mazer Chemical Company as PEG 200 dioleate (DO), PEG 200 ditallate (DT), PEG 400 dioleate (DO), PEG 400 ditallate (DT), PEG 600 dioleate (DO), and PEG 600 ditallate (DT). The sorbitan ester may be selected from POE(20) sorbitan trioleate or POE(40) sorbitol hexaoleate (both from Henkel). The polyoxyalkylene ester may be derived from polyoxyalkylene oleic acid which has the following structure:

or, polyoxyalkylene dioleic acid which has the following structure:

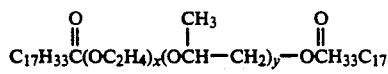

wherein x can be from 1-10 and y can be from 0 to 35 moles. This invention can be formulated at room temperature with no heating or cooling required. The blending of this aldol ether alcohol with the above surfactant(s) results in a foam control agent that is translucent, indicating complete blending, a characteristic which facilitates foam control function. Furthermore, such a composition is stable for at least three months, well beyond the product destabilization time exhibited by conventional treatment compositions. If desired, the mixture can be further diluted to 10-35% with water. The latter emulsion is thin, flowable and stable for up to 3 weeks for the purpose of short-term diluted product storage.

When a $\beta$-branched aldol ether alcohol is used with one or more surfactants having a pour point or melting point lower than 20° C. (e.g., PEG 600 DO), the product separates at 10°-20° C. This separation limits the use of this product, especially in the winter time. However, the addition of 0.25-1.5% water blended at room temperature prevents the separation, probably due to the microemulsion formation or association of water molecules with surfactant molecules.

The relative amounts of the individual components of the present defoamer composition are as follows (values are in weight percent):

| Component | Suitable | Preferred |
| --- | --- | --- |
| Aldol Ether Alcohol | 50-95 | 65 to 85 |
| Surfactant(s) | 5-50 | 15 to 35 |
| Water | 0.25 to 2 | 0.5 to 1 |

The compositions of this invention use inexpensive, commercially available raw materials, reduce shipping freight, reduce chemical costs (since they are basically 100% active), and also are much easier to handle and manufacture.

The amount of the composition of the present invention which is necessary to prohibit or reduce foam in the foaming medium depends upon the degree of active ingredients of the chemical components present. The amount of the antifoam/defoamer composition added to the foaming medium is an amount required to establish a concentration of from about 1.0 to about 500 ppm, based on volume. The preferable concentration range, however, is between 10 ppm and 100 ppm. The composition of the present invention may be added either continuously or intermittently directly to the white water drainage tank or at any other location in the papermaking process where foaming occurs.

EXAMPLES

To illustrate the efficacy of the invention, either synthetic fine paper machine white water or linerboard machine white water are used as the foaming media. The medium is circulated from a calibrated reservoir (in centimeters) via a pump and is returned back to the reservoir. This action agitates the medium, which in turn causes foam. A known amount of the defoamer to be treated is introduced into the test cell before the pump is turned on. The calibration of the test cell ranges from 0-295 cm; the medium usually occupies the first 145 cm. A longer time required for the foam to reach a certain level indicates a better defoamer. The time designated as time to top is recorded when the foam reaches the 295 cm level.

Alkaline fine paper synthetic white water test medium contains the following ingredients with respect to percentage by volume as listed:

| | |
| --- | --- |
| Tap Water | 25.00% |
| Deionized Water | 73.75% |
| AKD | 0.006% |
| 5% Starch | 0.40% |
| 37% Formaldehyde | 0.025% |
| 5% Rosin | 0.12% |
| 3% Al$_2$(SO$_4$)$_3$13H$_2$O | 0.10% |
| Cellulose | 0.40% |
| CaCO$_3$ | 0.20% |
| pH adjusted w/H$_2$SO$_4$ = | 7.3-7.5 |

The following ingredients, at the percentage by weight indicated, were mixed at room temperature.

Example 1
Defoaming Composition: 100.0% PEG 600 DO
Dilute to 15% with water

Example 2
Defoaming Composition: 100.0%
Aldol Ether Alcohol (MW = 450)

Example 3
Defoaming Composition: 100.0%
Aldol Ether Alcohol (MW = 500)

Example 4
Defoaming Composition: 79.60%
Aldol Ether Alcohol (MW = 500)
19.90% PEG 600 DO
0.50% Water
Dilute to 15% with water Example 5
Defoaming Composition: 80.0%
Aldol Ether Alcohol (MW = 450)
20.0% PEG 600 DO
Dilute to 15% with water Example 6
Defoaming Composition: A blend of polyglycol ester and a polyether surfactant
Dilute to 15% with water Example 7
Defoaming Composition: Fatty alcohol emulsion (13% active)

Example 8
Defoaming Composition: 64.0%
Aldol Ether Alcohol (MW = 500)
36.0% PEG 600 DO
Dilute to 15% with water Alkaline fine paper synthetic white water was used as the foaming medium. The test procedure is as defined above. FIGS. 1-4 show the results tested at different temperatures. As is evident from these figures, compositions according to the present invention (Examples 4 & 5) exhibit improved foam control characteristics when compared to conventional treatment programs. Testing performed with the compounds individually, even high and low molecular weight aldol ether alcohols (Examples 1, 2 & 3) resulted in poor performance. Furthermore, adding too much of PEG ester (i.e., PEG 600 DO) to the aldol ether alcohol as shown in Example 8, FIG. 1 decreases the defoaming performance considerably. Only the combination of aldol ether alcohol and various PEG esters according to the present invention presented acceptable efficacy.

FIG. 5 compares the efficacy of the novel composition (Example 4) with a fatty alcohol emulsion. This test was conducted on actual linerboard medium from a production mill. Again, it can be seen that Example 4 is found to be superior to a commercially successful fatty alcohol emulsion.

Having thus described my invention, what I claim is:

1. A composition comprising a β-branched aldol ether alcohol, water and at least one surfactant selected from the group consisting of sorbitan ester and the ester derived from either polyoxyalkylene oleic acid having the structure:

or, polyoxyalkylene dioleic acid having the structure:

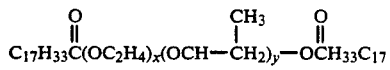

wherein x can be from 1-10 and y can be form 0 to 35 moles and the relative amounts of -branched aldol ether alcohol:surfactant:water are approximately 50-95%-;5-50%:0.25-2% by weight.

2. The composition according to claim 1 wherein the β-branched aldol ether alcohol has the structure:

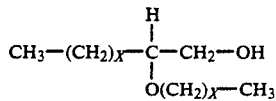

where X=5 to 8.

3. The composition according to claim 2 wherein the β-branched aldol ether alcohol has a hydroxyl value of 90-140.

4. The composition according to claim 1 wherein the reactive amounts of β-branched aldol ether alcohol:surfactant:water are approximately 65-85%:15-35%:0-.5-1%, by weight.

5. The composition according to claim 1 wherein the number average molecular weight (mw) of the β-branched aldol ether alcohol is approximately 320-500.

6. A method for reducing or preventing the generation of foam in the aqueous medium of paper processing comprising adding to the aqueous medium a composition comprising a β-branched aldol ether alcohol, water and at least one surfactant selected from the group consisting of sorbitan ester and the ester derived from either polyoxyalkylene oleic acid having the structure:

or, polyoxyalkylene dioleic acid having the structure:

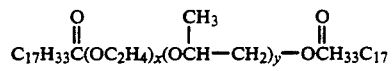

wherein x can be from 1-10 and y can be from 0 to 35 moles and the relative amounts of -branched aldol ether alcohol:surfactant:water are approximately 50-95%-:5-50%:0.25-2% by weight.

7. The method according to claim 6 wherein the aqueous medium is white water.

8. The method according to claim 6 wherein the β-branched aldol ether alcohol has the structure:

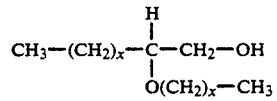

wherein X=5 to 8.

9. The method according to claim 8 wherein the β-branched aldol ether alcohol has a hydroxyl value of 90-140.

10. The method according to claim 6 wherein the relative amounts of β-branched aldol ether alcohol:surfactant:water are 65-85%:15-35%:0.5-1%, by weight.

11. The method according to claim 6 wherein the number average molecular weight of the β-branched aldol ether alcohol is approximately 320-500.

12. The method according to claim 6 wherein the amount of composition added to the aqueous medium is sufficient to establish a concentration of from about 1.0 to about 500 ppm, based on volume.

13. The method according to claim 6 wherein the composition is added to the aqueous medium continuously.

14. The method according to claim 6 wherein the composition is added to the aqueous medium intermittently.

* * * * *